United States Patent [19]
Chauvin

[11] 3,891,734
[45] June 24, 1975

[54] PROCESS FOR THE MANUFACTURE OF LIGHT GRANULATES

[75] Inventor: Raymond Chauvin, Verneuil-en-Halatte, France

[73] Assignees: Charbonnages de France, Paris; Houilleres du Bassin du Nord et du Pasde-Calais, Douai, both of France

[22] Filed: Aug. 22, 1973

[21] Appl. No.: 390,345

Related U.S. Application Data
[63] Continuation-in-part of Ser. No. 159,275, July 2, 1971, abandoned.

[30] Foreign Application Priority Data
July 10, 1970 France.............................. 70.25915

[52] U.S. Cl. ................................................. 264/43
[51] Int. Cl. ...................... C04b 33/32; C04b 35/64
[58] Field of Search .... 264/43; 106/DIG. 1, DIG. 2, 106/DIG. 3

[56] References Cited
UNITED STATES PATENTS
2,948,948  8/1960  Duplin, Jr. et al............ 106/DIG. 1
3,328,180  6/1967  Ban................................ 106/DIG. 1

*Primary Examiner*—Theodore Morris
*Attorney, Agent, or Firm*—Karl W. Flocks

[57] ABSTRACT

An expanded granular material, particularly intended as a lightweight aggregate for concrete, is produced by melting a finely ground fusible silico-aluminous material, such as fly ash, in the presence of a controlled atmosphere intended to inhibit the liberation of gases coming from the silico-aluminous material, and then forming the melt into drops and cooling under conditions to permit gases to excape from the material thereby causing its expansion.

12 Claims, 1 Drawing Figure

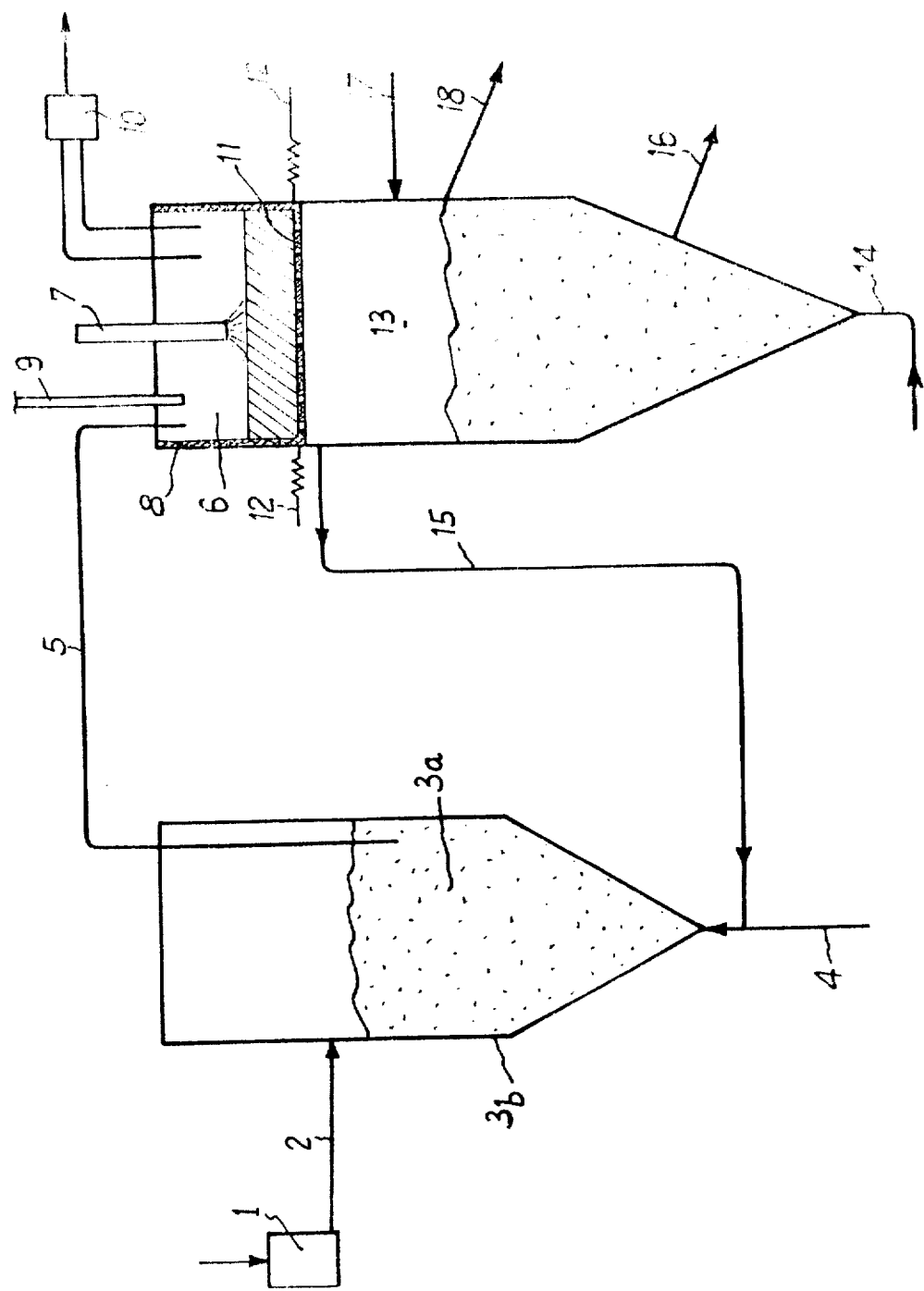

PROCESS FOR THE MANUFACTURE OF LIGHT GRANULATES

This application is a continuation-in-part of application Ser. No. 159,275, filed July 2, 1971 now abandoned.

The present invention relates to the manufacture of an expanded granular material and, more particularly, to a process for making such a material particularly intended as a lightweight aggregate for concrete, and of fusible silico-aluminous mineral materials, such as schist [a crystalline rock that can be split into scales or flakes, e.g., mica or shale], a fusible clay, or ash; and to an installation for carrying out such process.

Processes for manufacturing expanded lightweight granular aggregate from material such as schist or clay are known. Thus, French Pat. No. 1,527,088 describes a process of this kind which utilizes carbonaceous schist or fly ash as the starting materials. These known materials have the ability to produce gases at high temperature by the internal reaction of disassociation. According to this known process, the starting material is finely ground, is mixed and kneaded into granules, the granules are dried, and are then ignited and thoroughly oxidized before being expanded by violently heating and then cooling. Though this process gives a satisfactory product, it is undesirable in that it requires a large number of successive operations; consequently, on an industrial scale in particular the process is relatively complex to carry out and requires bulky and cumbersome apparatus.

On the other hand, there is a known process for the production of an expanded glass having the appearance of a sponge or foam. Thus, the U.S. Pat. No. 3,443,920 describes a process of manufacturing expanded glass by means of a swelling agent such as barium or strontium carbonate, which process consists in heating the mixture at high $CO_2$ pressure, followed by lowering the pressure. However, this process does not permit the production of granular aggregates. It is difficult to perform the process on materials that melt at high temperatures, because the process requires a high pressure. Also, the process is applicable only to glasses, i.e., to relatively pure silicates, which are amorphous and have weak ceramic properties, low mechanical strength and low melting point, and such process is not applicable to crude substances of irregular composition and of crystalline structure possessing strong ceramic properties and high mechanical strength, such as the fused products obtained from natural silico-aluminates or the by-products containing a certain amount of carbon and obtained in coal industry and in connection with utilization of coal, such as coal ashes, fly ash and coal coalmine shale obtained as residues of coal extraction and coal preparation.

It is, accordingly, an object of the present invention to overcome the deficiencies of the prior art, such as indicated above.

It is another object of the present invention to provide an improved process and apparatus for the manufacture of expanded granular material starting with raw material consisting of natural minerals or coal by-products such as schist, fusible clay or ashes, including fly ash.

It is another object of the present invention to provide a simplified process and apparatus for the manufacture of expanded granules, having low density, for example, from 0.6 to 1, for use as an aggregate in concrete.

Other objects and advantages of the instant invention will be apparent from the following generalized and detailed descriptions which set forth the improved and simplified procedure and apparatus of the present invention for the manufacture of expanded granules.

Generally, the process of the present invention consists essentially of melting the raw starting material in the presence of a controlled atmosphere in the vicinity of or at atmospheric pressure, the purpose of which is to limit the release of the gas produced by internal reaction of disassociation from the liquid; dividing the liquid into drops; expanding the drops by introducing them into a different atmosphere which permits the internal gas to escape; and cooling the expanded or expanding drops to provide the frozen, expanded granules useful as an aggregate.

The raw materials used in the present invention include all the fusible silico-aluminous materials such as schist, clay and ashes. Generally, such starting materials are ground in advance, though fine grinding is not essential. In particular, by-products of the coal industry, such as ground carbonaceous schist or shale, or fly ash from power stations, may be most satisfactorily employed.

Where carbon containing starting materials, such as carbonaceous shale, are employed, it is advantageous to first eliminate the carbon by oxidation of such starting material; this may be accomplished in any suitable device, such as a fluidized bed calcinator. In this case, the combustion of carbon results in preheating of the starting material at a temperature which may reach 1,000°–1,050°C. On the other hand, if a raw material is used which does not contain carbon, it may be advantageous to add to such raw material a combustible product, such as carbon, or coal or charcoal, and then to burn off the carbon, such as in a fluidized bed calcinator, to preheat the starting material.

Regardless of whether the raw material is finely ground and preheated or not, in accordance with the present invention the starting raw material is introduced into a chamber where it is melted in the presence of a controlled atmosphere, the purpose of which is to limit the release of gas which would be normally liberated from the raw mineral during such melting operation. Thus, melting of a silico-aluminous material such as schist, clay or ashes at temperatures higher than about 1,100°C. results in complex disassociation reactions and in oxidation/reduction reactions that are normally accompanied by the liberation of gases such as oxygen, carbon monoxide, carbon dioxide and sulfur dioxide-trioxide. In the present invention the release of such gases is restrained during the melting, and it is only later on during the formation of the drops that such gases are permitted to escape so as to provide expanded granules.

Since the above-described reactions which occur during the melting operation are usually in equilibrium, it is possible to influence the thermo-dynamic equilibrium of such reactions by varying the partial pressure of the gaseous constituents which are formed. Accordingly, given a predetermined temperature, it will be understood that certain of these equilibrium reactions can be controlled by increasing the partial pressure — in the atmosphere above the reaction medium — of the gas(es) liberated during such reactions. Though the pressure of each of the gases, or of mixtures thereof, or even all of the gases can be controlled by this technique in order to inhibit the release of gas from the reaction melt, it is preferred in accordance with the present invention to control the partial pressure of carbon monoxide, this being done for technical reasons associated with the materials employed.

In practice, the melting temperature in a reducing atmosphere, of the material used is determined by known laboratory methods, for example the pour or flow point according to ISO [International Organization for Standardization] recommendation No. 573, or by direct measurement of viscosity. Subsequently, the pressure of dissociation of carbon monoxide at a temperature which is slightly higher than the ascertained temperature of melting is determined.

This information is then utilized to maintain, above the liquid in the vat, a pressure of one gas, for example carbon monoxide, equal to or higher than the pressure determined by the laboratory methods. This maintenance may be accomplished advantageously by continuously analyzing the composition of the gas above the molten liquid and by regulating the feeding of the gas, in this case carbon monoxide, to the chamber so as to maintain the partial pressure thereof at a desired value.

It is preferable in the present invention to utilize either atmospheric pressure itself or pressure values situated in the vicinity of atmospheric pressure. Since the partial pressure of carbon monoxide applied above the reaction melt is a function of the melting temperature utilized, this melting temperature may be lowered, if necessary, by incorporating therein known fluxing agents such as lime, dolomite, iron oxide, alkali metal salts, etc., so as to lower the partial pressure of the carbon monoxide to a value lower than or equal to atmospheric pressure.

The chamber in which the melting is effected may be of a carbonaceous material which is not wettable by the molten raw material; such carbonaceous material may consist, for example, of graphite or any other type of vitreous or dense carbon, referred to hereinbelow as "graphite," or the reaction chamber may be formed of a refractory material. In the latter case, the melting generally takes place by the "pressure crucible" or "self retort" method*, the walls being cooled so as to be provided with a layer of solidified raw material. The chamber is advantageously heated by the Joule effect, for example by means of immersed or non-immersed electrodes supplied with alternating current. The graphite wall of the chamber may constitute one of the electrodes.

*also known as the "skull melting" process

According to another feature of the invention, the melt obtained by the above procedure is subsequently divided into drops in a different atmosphere such that the gases contained in the drops may escape therefrom, thereby causing expansion of the droplets simultaneously with solidification thereof. While this feature may be carried out using any satisfactory apparatus, a particularly advantageous arrangement for the preparation of such drops consists in placing at the bottom of the melting chamber a plate of suitable carbonaceous material, as defined above, having holes extending therethrough through which the melt may flow. The dimensions of the drops obtained will depend on the size of the holes and viscosity of the liquid melt, the latter being related to the temperature of the melt.

The dimension of the drops formed is of the order of 3 – 15 mm in accordance with the dimension of the orifices pierced in the bottom of the melting crucible and the characteristics of viscosity and surface-tension of the melted substance. Drops of 3 to 15 mm in diameter are thus the preferred size.

In accordance with a preferred embodiment, the carbonaceous plate having the holes passing therethrough is heated by an independent electrical circuit which permits adjustment of temperature. Accordingly, by varying the temperature of the plate, it is possible to vary the size of the drops by controlling the viscosity of the melt, and it is even possible to stop the flow completely by freezing the melt during its passage through the holes in the plate; in this latter case, the plate operates like a thermal valve.

According to another feature of the invention, the molten drops thus formed are solidified and expanded simultaneously. This is preferably accomplished by permitting the freshly formed drops to enter a chamber where the controlled composition of the atmosphere permits the internal gases to escape, thereby providing expansion, while simultaneously cooling the drops to solidification. For example, where the melting is effected in the graphite crucible under an increased partial pressure of carbon monoxide, it will be sufficient to merely introduce the drops into an atmosphere having a low carbon monoxide content, thereby insuring that the CO, the release of which was previously inhibited, will be released thereby effecting expansion of the drops; at the same time, the drops are rapidly cooled and solid, hard expanded granules are thereby obtained.

Because of the exceedingly high temperature of the melt, cooling may be provided by merely supplying air at ambient temperature. However, according to the preferred form of the invention, immediately upon being formed, the expanding drops are received in a fluidized bed of a substance such as sand. The sand damps the thermal shock of the granules and effects their quenching and solidification. Desirably the temperature of the fluidized bed is controlled to a value such that the freshly formed granules will not burst or explode.

The granules may be separated from the sand by a difference in their specific gravity, the fully expanded granules being considerably lighter in weight than the sand. In other words, the fluidized bed may have an overflow outlet near the top, at a given distance below the droplet forming plate, for removal of the expanded granules. As an alternative, the entire granule-sand mixture may be removed from the apparatus and separated by screening, with the sand then being returned continuously.

The gases passing out of the fluidized bed are advantageously recovered and used in the calcinator for the combustion of the carbon. If desired, cooling may be effected in two stages in successive fluidized beds, controlled at different temperatures.

The following detailed description of an embodiment of the invention, taken in conjunction with the drawing, will better illustrate the invention.

The sole FIGURE of the accompanying drawing is a diagrammatic illustration of an installation for carrying out the process of the present invention.

A suitable raw starting material, for example, coalmine shale or other carbonaceous schist, is passed into a suitable grinding device 1 of known construction. After grinding this material is passed through a pipe 2 into a fluidized bed 3a where it is calcined in the presence of air introduced through a duct 4. During calcination the raw material is brought to a temperature of about 1,000°C. and is thereafter pneumatically conveyed through a duct 5 to a melting chamber or reaction crucible 6.

While in the chamber 6, the calcined raw material is heated to a temperature of about 1,300°–1,400°C. and is thereupon reduced to a melt. The chamber 6 is heated electrically by means of a graphite electrode 7, the wall 8 of the chamber, likewise formed of graphite, serving as the second electrode. A suitable entrance duct 9 is provided for the feeding to the chamber 6 of a suitable fluxing agent, if desired. Also provided is suitable means 10, including a source of carbon monoxide and entrance and exit pipes to the chamber 6, for controlling the composition of the atmosphere in the chamber and permitting regulation of its carbon monoxide content.

At the bottom of the chamber 6 is provided a bottom wall 11, suitably formed of graphite or the like, and having holes passing therethrough having a diameter on the order of about 3 mm. The bottom wall 11 is preferably heated electrically by an independent circuit 12, and has electrical heating coils embedded therein thereby permitting regulation of the temperature of the bottom wall 11.

Disposed below the bottom wall 11 is a fluidized bed chamber 13 containing sand or the like, maintained at a temperature on the order of 250°–400°C. Molten drops passing through the holes in the bottom 11 of the chamber 6 fall into such fluidized bed of sand 13, and are cooled to solidification therein. No artificial carbon monoxide atmosphere is maintained, so that the reactions in the melt may proceed and the gases escape from the droplets to cause expansion thereof.

To maintain the fluidized bed, air is fed to the chamber 13 through a suitable inlet pipe 14. In accordance with known procedures, a fluidizing plate or other distributor may be provided, or other means utilized to control the flow rate of air in order to maintain a satisfactory fluidized bed. The air, after having been heated during the cooling of the expanded granules, then leaves the bed 13 through a suitable pipe 15 and is delivered to the inlet of the calcining fluidizer 3b where the heat picked up may be utilized.

According to one mode of removal of product, a mixture of the expanded granules and sand is discharged through a suitable exit duct 16, such as by vacuum, and the mixture is then separated by screening, the sand being reintroduced to the fluidized bed through entrance pipe 17. As an alternative, use may be made of the difference in specific gravity between the heavier sand and the light expanded granules, whereby the granules will tend to rise to the top of the fluidized bed where they may be withdrawn through a suitable overflow pipe 18.

Generally, in connection with coal-mine shale and fly ash of thermal power stations, there is observed the release of three or four different gases, depending on whether or not the material contains carbon. In the case where it does contain carbon, after the preheating at 1,000° – 1,050°C., the gases released are CO, $SO_2$ and a small amount of $CO_2$. If the carbon is completely burnt during the preheating which is effected with an excess of air, oxygen is also released. However, under the conditions of treatment which appear as optimal, a small amount of carbon exists in the preheated substances when admitted into the melting chamber. The most abundant gas in such a case is carbon monoxide (CO) and, consequently, it is preferred to control the partial pressure of this gas during the fusion of the raw materials. The formation of CO may result from a certain number of reactions some of which are given below as examples.

$FeO + C \rightleftarrows Fe + CO$     (1)
$SiO_2 + 3C \rightleftarrows SiC + 2 CO$     (2)
$2 Fe_3C + SiO_2 \rightleftarrows Fe_3Si + 3 Fe + 2 CO$     (3)

Where there are only supposedly pure reactive materials involved in each of the above reactions, the temperature at which the partial pressure of CO reaches atmospheric pressure is 700°C for reaction (1), 1,550°C for reaction (2) and 1,400°C for reaction (3). It is obvious that the equilibria are shifted in the case of mixtures that are as complex in composition as fly ash, schists, etc. Accordingly, the temperature is regulated so as to maintain a partial pressure of CO which prevents a premature release of gas.

EXAMPLE 1

The process of the invention was applied to the fly ash having the following compositions:

| | |
|---|---|
| $SiO_2$ | 50.3% |
| $Al_2O_3$ | 25.6% |
| $Fe_2O_3$ | 9.9% |
| $TiO_2$ | 1.0% |
| CaO + MgO | 5.9% |
| $Na_2O + K_2O$ | 7.1% |
| [Undetermined] | 0.2% |
| | 100.0% |

The content of unburnt carbon of these ashes was 2.9 percent; it dropped to 0.5 percent after a passage of a few tenths-of-seconds through a fluidized bed calcination apparatus operating at a 10 percent excess of air. After an addition of 5 percent of finely ground (< 0.2 mm) lime, for the purpose of lowering the melting point, the raw material was melted and brought to 1,330°C so that it could flow out through the openings of 3 mm and produce drops having the diameter of the order of 5 – 8 mm prior to expansion.

The kinetics of CO release produced by the mixture when heated at increasing temperature is such that the partial pressure of this gas attains 1 atmosphere at 1,370°C.

Good conditions of treatment were obtained by maintaining in the fusion compartment a total pressure of about 1 atmosphere, a partial pressure of CO of the order of 0.9 atmosphere (the complement being nitrogen and traces of $SO_2$ and $CO_2$) above the fused magma maintained between 1,330° and 1,340°C. In the lower compartment, the total pressure was likewise maintained in the vicinity of the atmospheric pressure, but the partial pressure of CO was practically zero.

After cooling, the expanded granules obtained had a density of 0.7 – 0.8 and a regular uniform granulometry: 5 – 15 mm for drops of 3 – 10 mm, respectively.

EXAMPLE 2

The process was applied to coal-mine shale having the following properties and compositions:

| | |
|---|---|
| Fire-produced losses | 10.4% |
| Combustible carbon | 4.5% |
| Chemical analysis of the calcined schists: | |
| $SiO_2$ | 60.5% |
| $Al_2O_3$ | 19.9% |
| $Fe_2O_3$ | 9.8% |
| $TiO_2$ | 1.1% |
| $CaO + MgO$ | 2.9% |
| $Na_2O + K_2O$ | 5.0% |
| $SO_3$ | 0.2% |
| Miscellaneous | 0.6% |

The coal-mine shales are calcined in fluidized bed with a small excess of air of the order of 10 percent. After calcination, the content of combustible carbon is of the order of 0.7 percent.

When heated, the coal-mine shales thus prepared bring about a release of CO which attains a partial pressure of 0.9 atmosphere at 1,330°C. This temperature is lower than the melting temperature of the coal-mine shales. It was thus desirable to add 10 percent lime to the coal-mine shales, so that the temperature at which the melted mass formed drops was lowered to 1,320°C. Then, the melted material was subjected to the same treatment as in Example 1. The expanded granules produced had a density of 0.7 - 0.8 and a regular uniform granulometry: 5 - 15 mm for the drops of 3 - 10 mm, respectively.

In the Examples given, the preheating was employed to bring the material to a temperature at which the fusion is economical and to reduce the content of carbon to a preferred value between 0.5 and 1 percent.

In regard to the partial pressure, it was seen that CO was the preferred gas. It is important to have a maximum partial pressure of CO in the fusion compartment; thus, a CO atmosphere is provided in the melting chamber but, naturally, the atmosphere will contain a small amount of other gases and, practically, the partial pressure will be of the order of 0.9. On the other hand, a minimum (i.e., almost zero) pressure of CO is maintained in the expansion compartment which contains an air atmosphere.

With regard to the raw materials, in a general manner any silico-aluminous substance (i.e., based on silica and alumina) may be suitable as raw material. Such substances are fly ash, clays and schists including coal-mine shale. These are all commonly known and used raw materials, and the observed compositions of coal-mine shales are situated in the following ranges:

| | |
|---|---|
| $SiO_2$ | 50 – 60% |
| $Al_2O_3$ | 18 – 25% |
| $Fe_2O_3$ | 0 – 10% |
| $TiO_2$ | 0.8 – 1.2% |
| $CaO + MgO$ | 2 – 7% |
| $K_2O + Na_2O$ | 5 – 7% |

For the purpose of expansion, the materials must also contain carbon and/or sulfur, which may be present therein in the free form or in the combined form such as cementite for carbon and sulfates for sulfur. The desirable content of carbon in the raw material is 4 – 10 percent prior to preheating. During the preheating, the largest portion of carbon burns while supplying an added amount of calories. The preheated product introduced into the melting tank has an optimal carbon content of 0.5 – 1 percent. A higher content of carbon may be used, but this is not of much interest because it provides no advantage; lower contents of carbon are undesirable because they lead to less-expanded products.

The process according to the present invention makes it possible to obtain lightweight, expanded granules, the homogeneous and uniform distribution of pores and the mechanical properties of which provide an excellent lightweight aggregate for use in lightweight concrete of high quality. It will be understood that modifications may be made without departing from the invention, and the invention is intended to cover what is claimed as the equivalents.

What is claimed is:

1. A process for the manufacture of lightweight aggregate from fusible silico-aluminous mineral capable of evolving gases by internal reaction of disassociation, comprising the following steps:
   a. melting at a temperature between 700° and 1,550°C. said fusible silico-aluminous material, selected from the group consisting of shale, fusible clay and ash, in an atmosphere at a pressure in the vicinity of the atmospheric pressure,
   b. restraining the release of liberated gas from the melt by maintaining above the melt the partial pressure of at least one of the gases normally liberated from the molten mineral at an elevated pressure no lower than the pressure at which said gas is formed in the resultant molten mineral, said gases being selected from the group consisting of oxygen, carbon dioxide, carbon monoxide, sulfur dioxide-trioxide;
   c. dividing said molten mineral into drops of 3 to 15 mm;
   d. simultaneously bringing said drops into contact with an atmosphere, different from said controlled atmosphere, wherein the partial pressure of said evolving gas is reduced to the vicinity of zero, thereby expanding said drops; and
   e. rapidly cooling the expanding drops to effect freezing of said drops to thereby form cooled expanded granules.

2. A process in accordance with claim 1, wherein said fusible silico-aluminous material is preheated at 600° to 1,050°C prior to melting.

3. A process for the manufacture of lightweight aggregate from fusible silico-aluminous mineral, which evolves gases upon being reduced to a melt, comprising:
   a. melting said fusible silico-aluminous mineral, selected from the group consisting of schist, fusible clay and ash, at a temperature of about 1,300° to 1,400°C. at a pressure of or near atmospheric pressure;
   b. controlling the atmosphere above the molten mineral by maintaining thereabove the partial pressure of one of the gases normally evolving from the molten mineral at an elevated pressure no lower than the pressure at which said gas is formed in the molten mineral;
   c. dividing said molten mineral into drops and immediately passing said drops into a fluidized bed containing an atmosphere wherein the partial pressure of said evolving gas is reduced in comparison with the partial pressure of said evolving gas in step (b) to thereby permit expansion of said drops; and
   d. expanding said drops in said fluidized bed and rapidly cooling the expanding drops to thereby form cooled expanded granules.

4. A process in accordance with claim 3 further comprising preheating said fusible silico-aluminous material, wherein the preheating is carried out in a fluidized bed, the gaseous fluidizing medium from said cooling operation passing to said preheating operation.

5. A process in accordance with claim 3 wherein said melting is effected in a retort of graphite not wettable by the molten silico-aluminous material, and said partial pressure controlled is that of carbon monozide.

6. A process in accordance with claim 3 in which the melting is effected in accordance with the skull melting method, and said partial pressure regulated is that of at least a gas selected from the group consisting of carbon monoxide, carbon dioxide and sulfur dioxide.

7. A process in accordance with claim 3 wherein the partial pressure of carbon monoxide within said controlled atmosphere is atmospheric pressure.

8. A process in accordance with claim 3 wherein said molten mineral is divided into drops by passage downwardly through a perforated plate.

9. A process in accordance with claim 1, comprising starting with a fusible silico-aluminous mineral containing carbonaceous material, and preheating said mineral at about 1,000°–1,050°C. to reduce said carbon to an amount below 1 percent prior to said melting of said fusible silico-aluminous material.

10. A process in accordance with claim 1, comprising first preheating said fusible silico-aluminous mineral, and the effecting said melting, said melting being carried out by heating according to the Joule effect by means of graphite electrodes fed with alternating current.

11. A process for the manufacture of lightweight aggregate from fusible silico-aluminous mineral selected from the group consisting of shale, fusible clay and ash, comprising:

preheating said fusible silico-aluminous mineral in a first fluidized bed to eliminate by oxidation the major portion of any carbon present;

melting said preheated fusible silico-aluminous mineral selected from the group consisting of shale, fusible clay and ash, by further heating and restraining the release of liberated gases including carbon monoxide by maintaining the melt under an elevated partial pressure of carbon monoxide equal to atmospheric pressure;

dividing said molten silico-aluminous mineral into droplets;

bringing said droplets into a second fluidized bed having a reduced partial pressure of said carbon monoxide, thereby expanding said droplets; and rapidly cooling the expanding droplets in said second fluidized bed to effect freezing of said droplets to thereby form cooled expanded granules, and passing the fluidizing medium from said second fluidized bed to said first fluidized bed.

12. A process in accordance with claim 11 wherein said silico-aluminous mineral is shale.

* * * * *